United States Patent
Cho et al.

(10) Patent No.: US 9,966,007 B2
(45) Date of Patent: May 8, 2018

(54) ORGANIC LIGHT EMITTING DISPLAY AND METHOD FOR CONTROLLING EMISSION THEREOF

(71) Applicant: LG DISPLAY CO., LTD., Seoul (KR)

(72) Inventors: Hyungnyuck Cho, Paju-si (KR); Janghoon Song, Uijeongbu-si (KR)

(73) Assignee: LG DISPLAY CO., LTD., Seoul (KR)

( * ) Notice: Subject to any disclaimer, the term of this patent is extended or adjusted under 35 U.S.C. 154(b) by 29 days.

(21) Appl. No.: 15/191,264

(22) Filed: Jun. 23, 2016

(65) Prior Publication Data

US 2017/0004766 A1    Jan. 5, 2017

(30) Foreign Application Priority Data

Jun. 30, 2015 (KR) .................. 10-2015-0093673

(51) Int. Cl.
*G09G 3/32* (2016.01)
*G09G 3/30* (2006.01)
(Continued)

(52) U.S. Cl.
CPC ......... *G09G 3/3233* (2013.01); *G06F 1/1652* (2013.01); *G09G 3/3266* (2013.01); *G09G 3/3275* (2013.01); *G09G 2300/0861* (2013.01); *G09G 2310/08* (2013.01); *G09G 2320/0247* (2013.01); *G09G 2330/021* (2013.01); *G09G 2330/022* (2013.01); *G09G 2330/028* (2013.01); *G09G 2340/0435* (2013.01)

(58) Field of Classification Search
CPC .. G09G 3/3233; G09G 3/3266; G09G 3/3275; G09G 3/3208; G09G 3/003; G09G 3/3258; G09G 3/32; G09G 3/3648; G09G 3/3696; G09G 2310/08; G09G 2310/027; G09G 2320/0247; G09G 2320/0233; G09G 2320/0626; G09G 2320/0257; G09G 2320/0261; G09G 2320/064; G09G 2330/021; G09G 2330/022; G09G 2330/028

See application file for complete search history.

(56) References Cited

U.S. PATENT DOCUMENTS 9,370,075 B2 * 6/2016 Chaji ................... H05B 37/02
2006/0267509 A1 11/2006 Yang
(Continued)

FOREIGN PATENT DOCUMENTS

JP      2006-30516 A       2/2006
KR  10-2012-0008149 A      1/2012

*Primary Examiner* — Xuemei Zheng
(74) *Attorney, Agent, or Firm* — Birch, Stewart, Kolasch & Birch, LLP (57) ABSTRACT

Discussed are an organic light emitting display which can reduce flicker, along with power consumption, and a driving method thereof. In a low-power operation mode of the organic light emitting display, at least one holding frame is placed between writing frames in which image data is written, the output of the source driver is enabled during the writing frames, the output of the source driver is disabled during the holding frames, and the emission driver is controlled during the holding frames to increase the toggle frequency of the emission signal to be higher than or equal to N times the frame frequency (N is a positive integer greater than or equal to 2). The driving method can reduce the perceived flicker.

11 Claims, 11 Drawing Sheets

(51) Int. Cl.
    *G09G 3/3233*    (2016.01)
    *G06F 1/16*    (2006.01)
    *G09G 3/3266*    (2016.01)
    *G09G 3/3275*    (2016.01)

(56) References Cited

U.S. PATENT DOCUMENTS

| | | |
|---|---|---|
| 2007/0222718 A1 | 9/2007 | Takahara |
| 2008/0068312 A1 | 3/2008 | Kim |
| 2011/0148826 A1 | 6/2011 | Koyama et al. |
| 2012/0320009 A1* | 12/2012 | Liu ................... G09G 3/3614 345/204 |
| 2013/0099692 A1* | 4/2013 | Chaji .................... H05B 37/02 315/224 |
| 2013/0127923 A1 | 5/2013 | An et al. |
| 2013/0147857 A1* | 6/2013 | Kurikko ................ G09G 3/20 345/690 |
| 2015/0138258 A1 | 5/2015 | Lee et al. |
| 2016/0171932 A1 | 6/2016 | Eom et al. |
| 2016/0329017 A1* | 11/2016 | Chaji .................... H05B 37/02 |

* cited by examiner

FIG. 12

ORGANIC LIGHT EMITTING DISPLAY AND METHOD FOR CONTROLLING EMISSION THEREOF

CROSS REFERENCE TO THE RELATED APPLICATIONS

This application claims the priority benefit of Korean Patent Application No. 10-2015-0093673 filed on Jun. 30, 2015, which is hereby incorporated herein by reference for all purposes as if fully set forth herein.

BACKGROUND OF THE INVENTION

Field of the Invention

The embodiments of the invention relate to an organic light emitting display and a driving method thereof.

Discussion of the Related Art

An active-matrix organic light emitting display comprises organic light emitting diodes OLEDs that emit light themselves, and has the advantages of fast response time, high luminous efficiency, high luminance, and wide viewing angle.

An OLED, which is a self-luminous device, comprises an anode and a cathode, and organic compound layers formed between the anode and cathode. The organic compound layers comprise a hole injection layer HIL, a hole transport layer HTL, an emission layer EML, an electron transport layer ETL, and an electron injection layer EIL. When an operating voltage is applied to the anode and the cathode, a hole passing through the hole transport layer HTL and an electron passing through the electron transport layer ETL move to the emission layer EML, forming an exciton. As a result, the emission layer EML generates visible light.

In an organic light emitting diode display, pixels each comprising an organic light emitting diode are arranged in a matrix, and the luminance of the pixels is adjusted based on the grayscale of video data. Each individual pixel comprises a driving TFT (thin-film transistor) that controls the drive current flowing through the OLED based on a voltage Vg applied between its gate and source electrodes, and adjusts the display's grayscale (luminance) by the amount of light emitted by the OLED, which is proportional to the drive current.

Each pixel is connected to a source driver via a data line and to a scan driver via a scan line. Each pixel may be further connected to an emission driver via an emission line.

For use on such organic light emitting displays, the technology for adjusting an emission duty of OLED using the emission driver was developed, in order to reduce display defects (known as "mura") that are produced in the laser annealing process of a TFT process. However, this leads to the problem of increased power consumption.

SUMMARY OF THE INVENTION

An aspect of the present invention provides an organic light emitting display which can reduce flicker, along with power consumption, and a driving method thereof.

Another aspect of the present invention provides an organic light emitting display comprising: a display panel; a source driver that drives data lines associated with the display panel; a scan driver that feeds a scan signal to scan lines associated with the display panel; an emission driver that feeds an emission signal to emission lines associated with the display panel; and a timing controller. In low-power operation mode, the timing controller places at least one holding frame between writing frames in which image data is written, enables the output of the source driver during the writing frames and disables the output of the source driver during the holding frames, and increases the toggle frequency of the emission signal to be higher than or equal to N times the frame frequency (N is a positive integer greater than or equal to 2) by controlling the emission driver during the holding frames.

Another aspect of the present invention provides a driving method of an organic light emitting display comprising: a display panel; a source driver that drives data lines associated with the display panel; a scan driver that feeds a scan signal to scan lines associated with the display panel; and an emission driver that feeds an emission signal to emission lines associated with the display panel, the method comprising: detecting low-power operation mode; placing at least one holding frame between writing frames in which image data is written, and enabling the output of the source driver during the writing frames and disabling the output of the source driver during the holding frames; and increasing the toggle frequency of the emission signal to be higher than or equal to N times the frame frequency (N is a positive integer greater than or equal to 2) by controlling the emission driver during the holding frames.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 is a circuit diagram illustrating a circuit block whose operation is OFF and a circuit block whose operation is ON;

DETAILED DESCRIPTION OF THE EMBODIMENTS

Hereinafter, example embodiments of the present invention will be described in detail with reference to the accompanying drawings. Throughout the specification, like numbers refer to like elements.

Hereinafter, example embodiments of the present invention will be described with reference to FIGS. 1 to 11.

FIGS. 1 to 10 are views for explaining an organic light emitting display according to the present invention.

Figure 1:
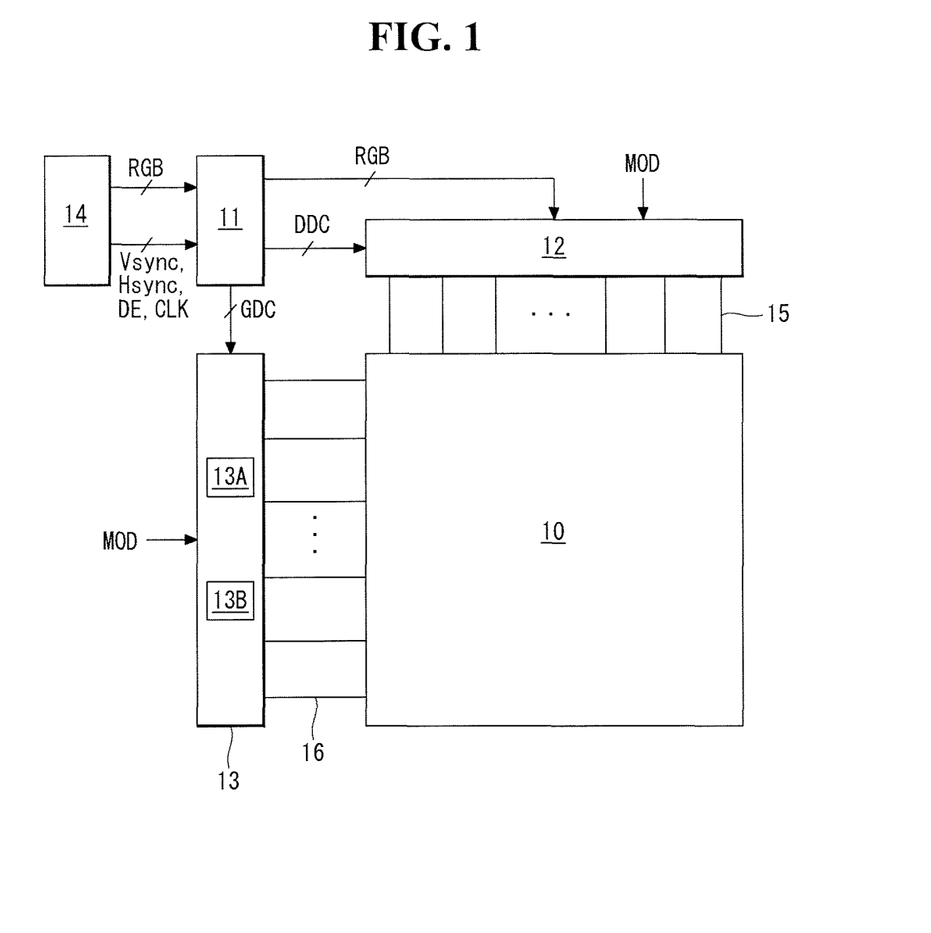
FIG. 1 is a block diagram of an organic light emitting display according to an embodiment of the present invention.

Referring to FIG. 1, an organic light emitting display according to an embodiment of the present invention includes a display panel 10, a timing controller 11, a source driver 12, and a gate driver 13.

Figure 2A:
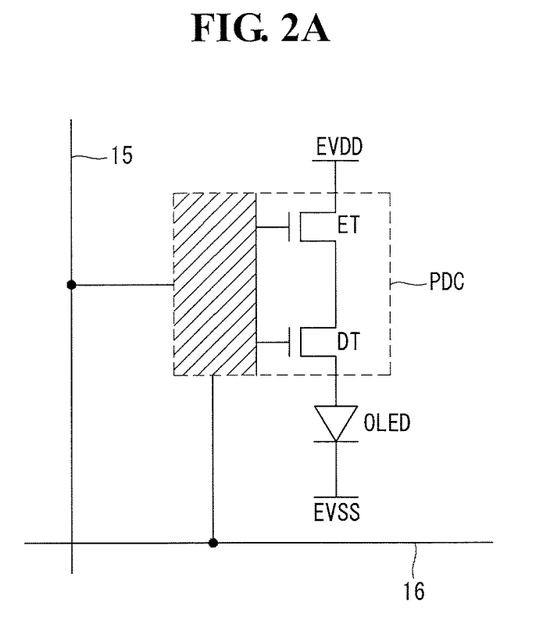
FIG. 2A and FIG. 2B are circuit diagrams of a pixel in the display panel of FIG. 1.
Figure 2B:
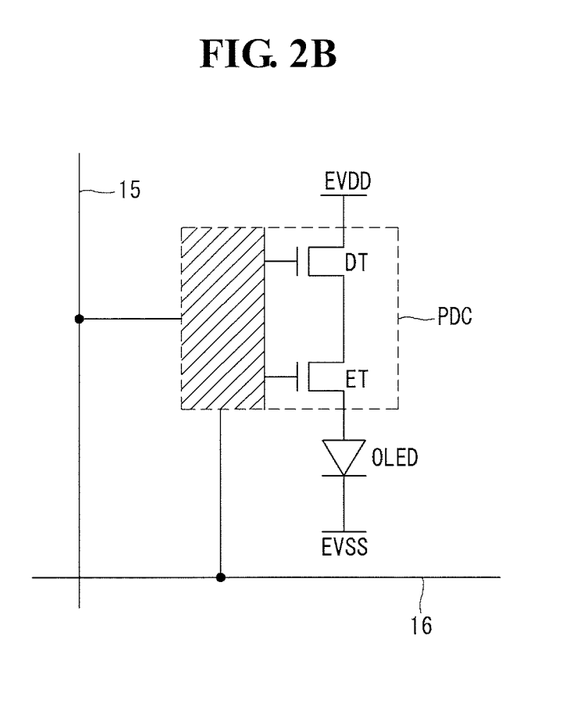

A plurality of data lines 15 and a plurality of gate lines 16 intersect each other on the display panel 10, and pixels are arranged in a matrix at the intersections. Each of the gate lines 16 comprises a scan line and an emission line. Each individual pixel comprises an OLED and a cell driver. As shown in FIGS. 2A and 2B, the cell driver PDC comprises a driving TFT DT that controls the amount of drive current flowing through the OLED and an emission TFT ET that controls the duty cycle of light emission by the OLED by controlling the inflow of drive current into the OLED. The drive current applied to the OLED is determined by the gate-source voltage of the driving TFT DT. The amount of light emitted by the OLED is proportional to the drive current fed from the driving TFT DT. The emission TFT ET is connected between a high-voltage power supply EVDD and a low-voltage power supply EVSS and switched on in response to an emission signal from the emission line to turn the flow of drive current on or off. The emission TFT ET may be connected between the high-voltage power supply EVDD and the drain electrode of the driving TFT DT, as shown in FIG. 2A, or may be connected between the source electrode of the driving TFT DT and the anode of the OLED, as shown in FIG. 2B.

The cell driver PDC may further comprise a switching TFT for programming the gate-source voltage of the driving TFT DT and at least one storage capacitor for maintaining a programmed voltage for a certain period of time. When the switching TFT is turned on in response to a scan signal, it stores a data voltage from a data line 15 in one electrode of the storage capacitor.

Such a pixel is supplied with a high-level voltage EVDD and a low-level voltage EVSS from a power supply block. The TFTs constituting each pixel may be implemented as p-type, n-type, or hybrid-type. Also, a semiconductor layer of the TFTs in the pixel may comprise amorphous silicon, polysilicon, or an oxide semiconductor, such as an Indium Tin Oxide (ITO), layered composition of an oxide and metal or composition of an oxide and carbon nanotubes, which exhibit favorable off-current characteristics. The use of oxide TFTs offers the benefit of minimizing image changes caused by off current during holding frames of low-power operation mode to be described later. Also, the display panel 10 may be a flexible display panel that includes a flexible substrate.

The source driver 12 converts digital video data RGB of an input image to a data voltage under the control of the timing controller 11, and supplies this data voltage to the data lines 15. The source driver 12, may be made up of one chip, along with the timing controller 11.

The gate driver 13 includes a scan driver 13A that drives the scan lines and an emission driver 13B that drives the emission lines. The scan driver 13A generates a scan signal and feeds it to the scan lines, and the emission driver 13B generates an emission signal and feeds it to the emission lines. The gate driver 13 may be built in a non-display area of the display panel 10, or placed externally in the form of an IC and bonded to the display panel 10.

Figure 3:
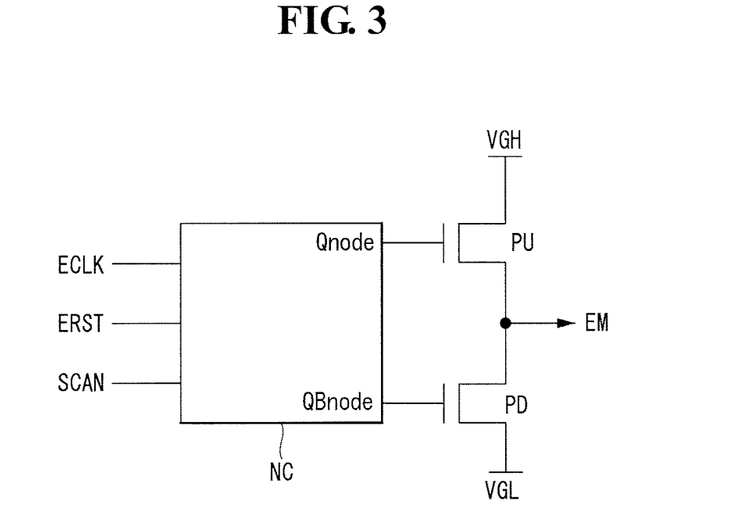
FIG. 3 is a circuit diagram of one stage of the emission driver of FIG. 1.

FIG. 3 illustrates one stage of the emission driver of FIG. 1. Based on a scan signal, the emission driver 13B may generate an emission signal having a different phase from that of the scan signal. To this end, the emission driver 13B includes a node control part NC, a pull-up switch PU, and a pull-down switch PD. The node control part NC switches on the pull-up switch PU and the pull-down switch PD in turn, based on an emission clock ECLK, emission reset signal ERST, and scan signal SCAN that are input from the outside. The pull-up switch PU includes a gate electrode connected to a Q node of the node control part NC, a drain electrode connected to a gate-high voltage source VGH, and a source electrode connected to an output node. The pull-down switch PD includes a gate electrode connected to a QB node of the node control part NC, a drain electrode connected to the output node, and a source electrode connected to a gate-low voltage source VGL. The pull-up switch PU and the pull-down switch PD may be implemented as p-type, n-type, or hybrid-type.

The timing controller 11 receives digital video data RGB of an input image from a host system 14 through an interface circuit (described later), and feeds the digital video data RGB of this input image to the source driver 12 using a mini-LVDS interface, or other type of display interface.

The timing controller 11 receives timing signals such as a vertical synchronization signal Vsync, a horizontal synchronization signal Hsync, a data enable signal DE, and a dot clock CLK, and generates control signals for controlling the operation timings of the source driver 12 and gate driver 13. The control signals comprise a timing control signal GDC for controlling the operation timing of the gate driver 13 and a source timing control signal DDC for controlling the operation timing of the source driver 12.

The timing controller 11 generates a mode signal MOD based on user input information transmitted from the host system 14, and runs the source driver 12 and the gate driver 13 in normal operation mode or in low-power operation mode based on the mode signal MOD.

Figure 4:
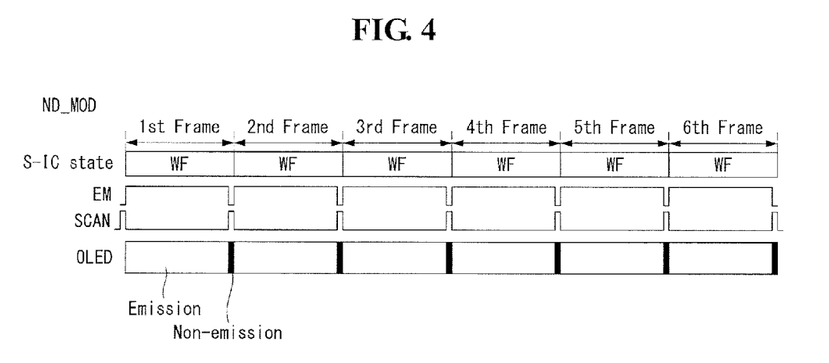
FIG. 4 illustrates a source driver's operation state and gate driving signals in normal operation mode.

In normal operation mode, the timing controller 11 refreshes a displayed image every frame by controlling the operation of the source driver 12 and gate driver 13. For example, in normal operation mode, each frame acts as a writing frame WF in which image data is written, as shown in FIG. 4. The timing controller 11 controls the scan driver 13A to keep the toggle frequency of a scan signal SCAN applied to the same pixel equal to the frame frequency, and controls the emission driver 13B to keep the toggle frequency of an emission signal EM applied to the same pixel equal to the frame frequency. In this instance, the OLED emits light in a period in which the emission signal EM is held at ON level, and emits no light in a period in which the emission signal EM is held at OFF level.

Figure 5:
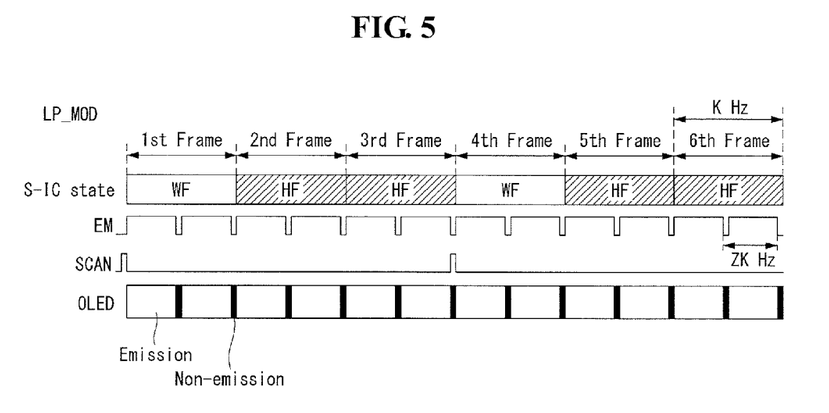
FIG. 5 illustrates a source driver's operation state and gate driving signals in low-power operation mode.

In low-power operation mode, the timing controller 11 refreshes a displayed image at intervals of more than 1 frame by controlling the operation of the source driver 12 and gate driver 13 in order to reduce power consumption. To this end, the timing controller 11 may place at least one holding frame HF, in which output of the source driver 12 is disabled, between writing frames WF, in which image data is written by the source driver 12. For example, in low-power operation mode, two holding frames HF may be placed between writing frames WF, as shown in FIG. 5. The timing controller 11 controls the scan driver 13A to decrease the toggle frequency of the scan signal SCAN applied to the same pixel to be lower than the frame frequency (for example, if the frame frequency is K Hz (K is a positive integer) and two holding frames HF are placed between writing frames WF, the toggle frequency of the scan signal SCAN is KHz/3).

Figure 6:
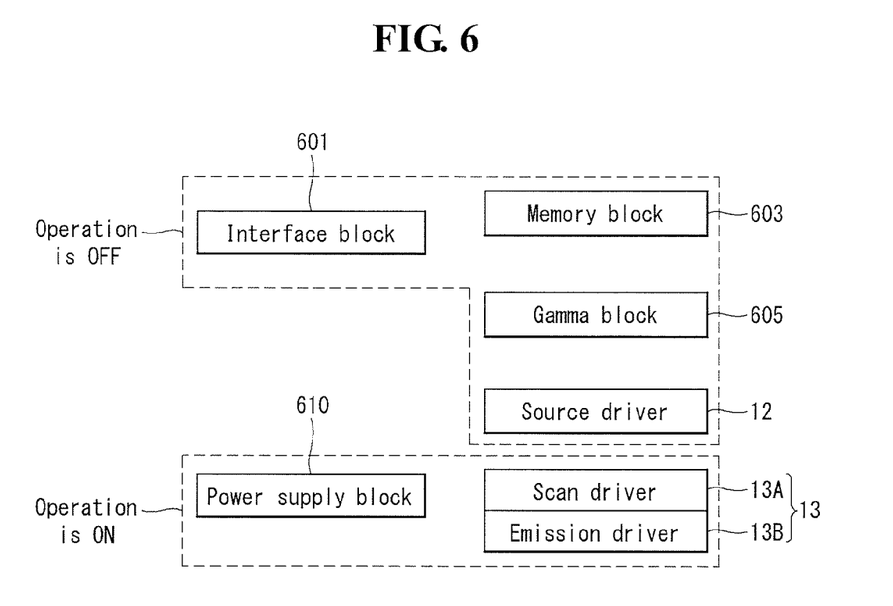

In low-power operation mode, the timing controller 11 enables the output of the source drive 12 during the writing frames WF, and disables the output of the source driver 12 during the holding frames HF. To further reduce power consumption in low-power operation mode, the timing controller 11 may disable the operation of the source driver 12, instead of running the power supply block 610 and the gate driver 13, as shown in FIG. 6. That is, the drive power applied to the source driver 12 is interrupted in the holding frames HF, and therefore the static current flowing through output buffers of the source driver 12 is eliminated, thereby significantly reducing the power consumption of the source driver 12.

To further reduce power consumption in low-power operation mode, the timing controller 11 may disable the operation of an interface circuit 601, memory block 603, and gamma block 605 during the holding frames HF, as shown in FIG. 6. Here, the interface circuit 601 receives digital video data RGB of an input image from the system 14. The memory block 603 stores information required for driving the display panel 10, and the gamma block 605 generates a gamma reference voltage and feeds it to the source driver 12.

In order to reduce flicker in low-power operation mode, the timing controller 11 controls the emission driver 13B to increase the toggle frequency of the emission signal EM applied to the same pixel to be higher than or equal to N times the frame frequency (N is a positive integer greater than or equal to 2) during the holding frames HF.

The principle that flicker is reduced as the toggle frequency of the emission signal EM increases during the holding frames HF will be described below.

In general, a contrast pattern for measuring time frequency characteristics is as in Equation 1:

$$A(t)=A_0(1+m\cos 2\pi ft)$$ [Equation 1]

where $A_0$ is the average luminance, m is the modulation depth, and f is the frequency. Test methods include a first method of obtaining a discrimination threshold when the time frequency f is kept constant and the modulation degree m is varied, and a second method of obtaining a discrimination threshold when the modulation degree is fixed and the time frequency f is varied. With the former method, the visual system's transfer function, i.e., a time frequency characteristic, is measured, and with the latter method, a critical fusion frequency characteristic is measured.

Figure 7A:
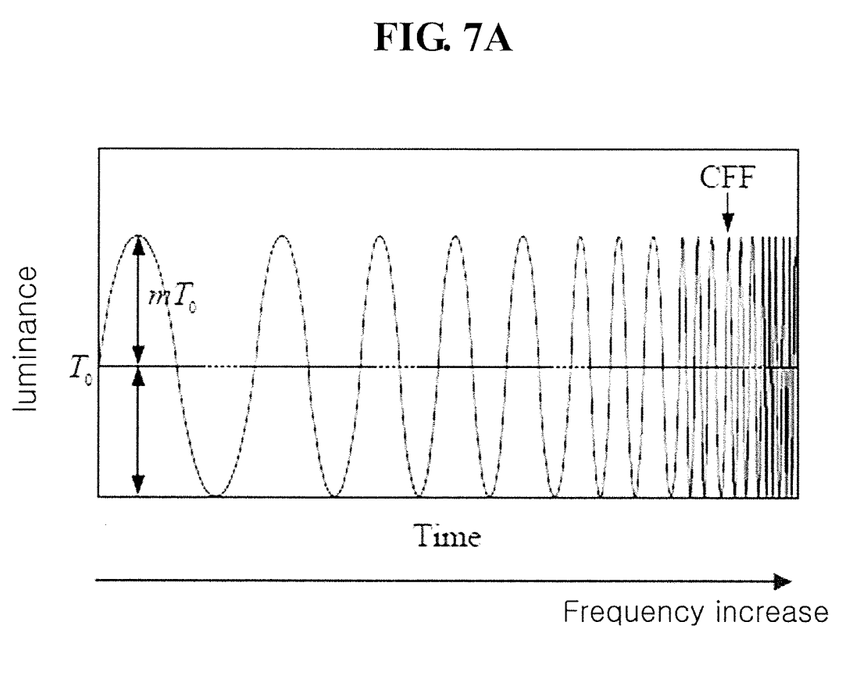
FIG. 7A is a diagram illustrating the waveform of a physically applied luminance stimulus signal.
Figure 7B:
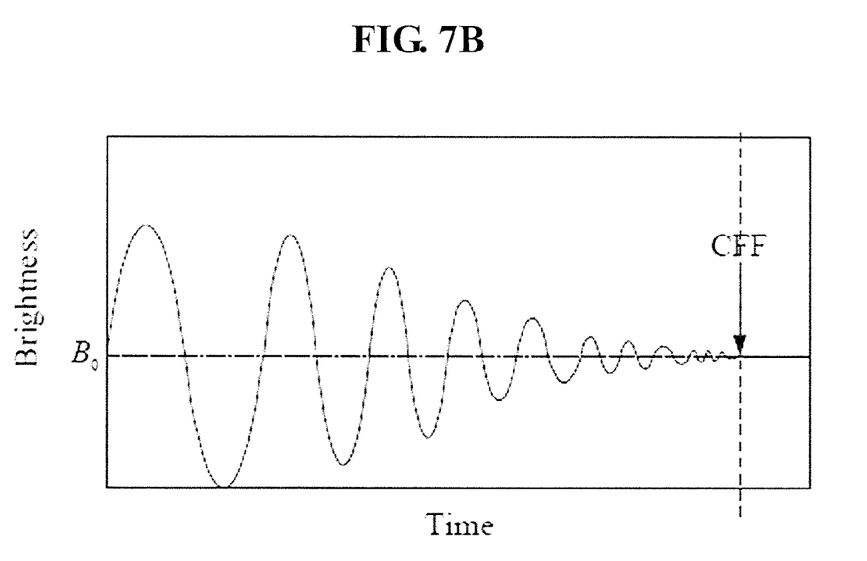
FIG. 7B is a diagram illustrating the waveform of a brightness signal perceived by the human eye.

Flicker is a temporal change in the luminance of a test screen perceived by the human eye, which depends on the luminance varying frequency and average luminance. Critical fusion frequency or critical flicker frequency (CFF) is defined as the frequency at which the luminance appears to be at a steady level without the perception of flicker after an increase in luminance varying frequency. Flicker and CFF are illustrated in FIGS. 7A and 7B. FIG. 7A and Equation 2 show the waveform of a physically applied luminance stimulus signal, and FIG. 7B and Equation 3 show the waveform of a brightness signal.

$$A(t) = T_0(1 + m\cos 2\pi ft)$$ [Equation 2]
$$m = \frac{\Delta T_0}{T_0}, (0 < m < 1)$$

$$B(t) = B_0(1 + m'\cos 2\pi ft)$$ [Equation 3]

The brightness perceived by the human eye at a frequency above the critical fusion frequency CFF corresponds to the average value of radiation luminance signals varying with alternating current. That is, stimuli at or above the critical fusion frequency CFF look the same to the human eye.

To further reduce flicker in low-power operation mode, the timing controller 11 may control the emission driver 13B to increase the toggle frequency of the emission signal EM applied to the same pixel to be higher than or equal to N times the frame frequency (N is a positive integer greater than or equal to 2) during the writing frames WF as well.

On the other hand, in view of power consumption in low-power operation mode, the timing controller 11 may control the emission driver 13B to keep the toggle frequency of the emission signal EM applied to the same pixel equal to the frame frequency during the writing frames WF. Although increasing the toggle frequency of the emission signal EM may be an effective way to reduce flicker, this may increase power consumption. The timing controller 11 may reduce power consumption by increasing the toggle frequency of the emission signal EM only during the holding frames HF but not during the writing frames WF.

Figure 8:
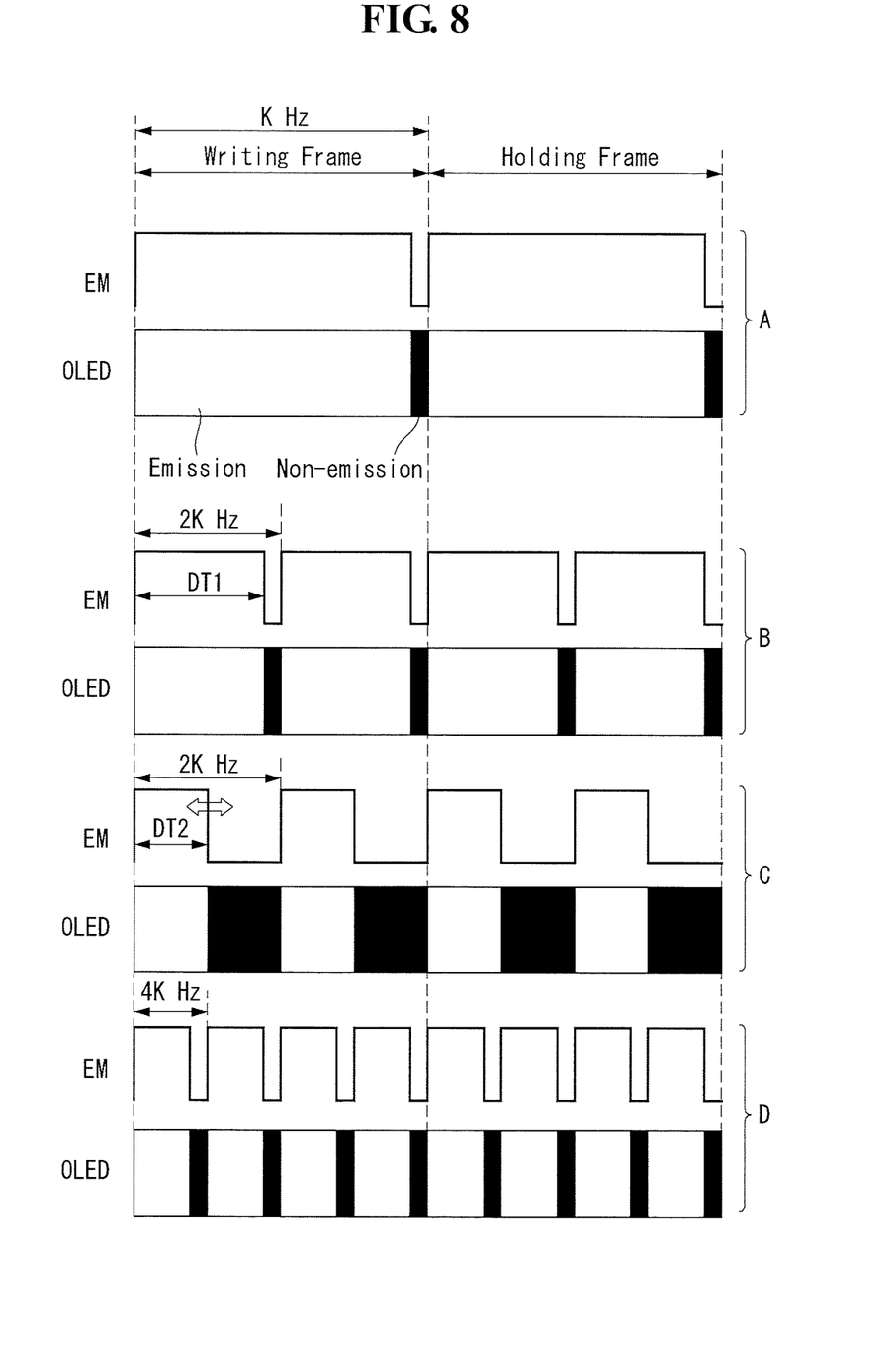
FIG. 8 is a diagram illustrating various examples of adjusting the toggle frequency and ON duty ratio of an emission signal in low-power operation mode.

In the meantime, the OLED may emit light in a period in which the emission signal EM is held at ON level, and may emit no light in a period in which the emission signal EM is held at OFF level. An emission period of the OLED is determined by the ON duty ratio of the emission signal EM, as shown in FIG. 8. Especially, the timing controller 11 may vary the toggle frequency of the emission signal EM depending on the ON duty ratio of the emission signal EM, in order to remove flicker more effectively.

For example, in case "A" of FIG. 8, flicker may be visible because the toggle frequency of the emission signal EM is equal to the frame frequency (K Hz). In cases "B" and "C" of FIG. 8, less flicker is visible compared to case "A", because the toggle frequency (2K Hz) of the emission signal EM is twice as much as the frame frequency (K Hz). While the toggle frequency (2K Hz) of the emission signal EM is the same for cases "B" and "C", the ON duty ratio (DT1>DT2) of the emission signal EM in case "B" is longer than that in case "C", whereby flicker can be removed more effectively. In case "D", the toggle frequency (4K Hz) of the emission signal EM is four times as much as the frame frequency (K Hz), whereby much less flicker is visible compared to case "A".

Figure 9:
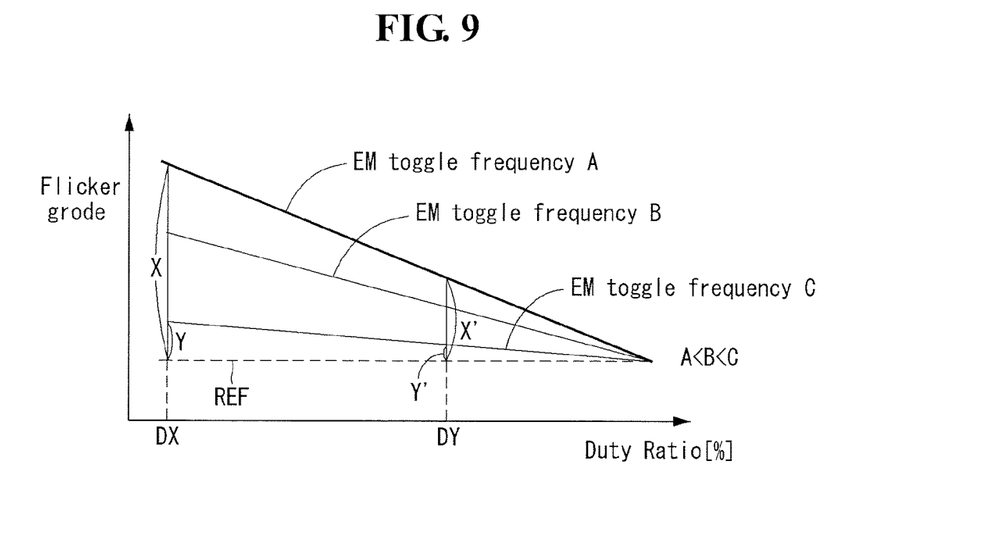
FIG. 9 is a diagram illustrating the toggle frequency of the emission signal being controlled to be inversely proportional to the ON duty ratio in low-power operation mode.

FIG. 9 illustrates toggle frequency in terms of the relationship between flicker and duty ratio of the emission signal EM. Specifically, the timing controller 11 may control the toggle frequency of the emission signal EM to be inversely proportional to the ON duty ratio of the emission signal EM, as shown in FIG. 9, in order to effectively remove flicker in low-power operation mode. In FIG. 9, X represents a flicker difference with respect to a reference value at a ON duty ratio DX of the emission signal EM and a toggle frequency A of the emission signal EM, and Y represents a flicker difference with respect to the reference value at the ON duty ratio DX of the emission signal EM and a toggle frequency C of the emission signal EM. Also, in FIG. 9, X' represents a flicker difference with respect to a reference value at a ON duty ratio DY of the emission signal EM and the toggle frequency A of the emission signal EM, and Y' represents a flicker difference with respect to the reference value at the ON duty ratio DY of the emission signal EM and the toggle frequency C of the emission signal EM.

Referring to FIG. 9, if the ON duty ratio of the emission signal EM has a first value DX, this creates a large difference in the amount of flicker reduction depending on the toggle frequency. Thus, the toggle frequency of the emission signal EM may be set to the highest value C. In contrast, if the ON duty ratio of the emission signal EM has a second value DY greater than the first value DX, this creates a relatively small difference in the amount of flicker reduction depending on the toggle frequency. Thus, the toggle frequency of the emission signal EM may be set to B or A, which is lower than C.

Figure 10:
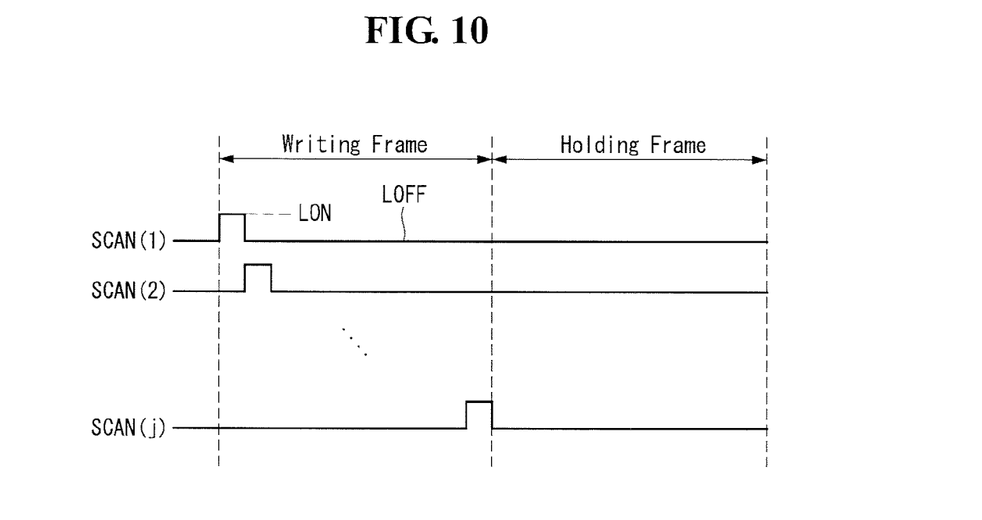
FIG. 10 is a diagram illustrating the driving waveform of a scan signal in low-power operation mode.

In low-power operation mode, the timing controller 11 may control the scan driver 13A to increase the operational stability of pixels so that the toggle frequency of the scan signal SCAN applied to the same pixel is decreased to be lower than the frame frequency. In low-power operation mode, the scan driver 13A may generate a scan signal SCAN of ON level LON during each writing frame and hold the scan signal SCAN at OFF level during the holding frames, as shown in FIG. 10. Since the switching TFT of each pixel is held at OFF by the scan signal SCAN of OFF level during the holding frames, the driving TFT may be able to perform a static current operation based on a gate-source voltage.

Figure 11:
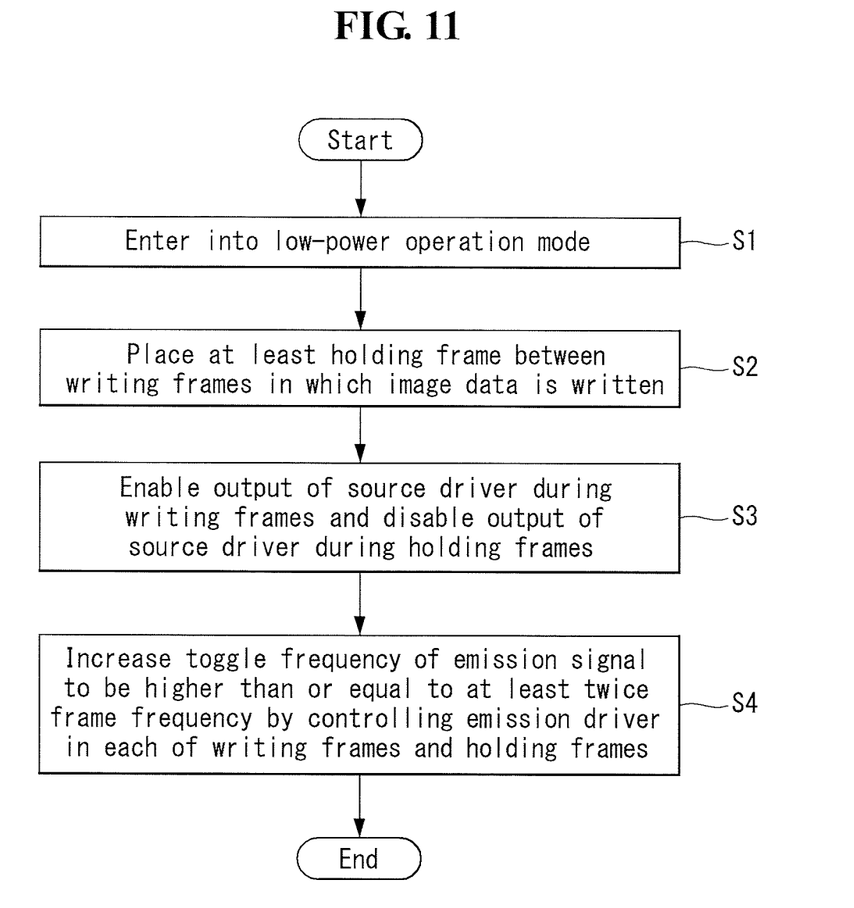
FIG. 11 is a flowchart illustrating a driving method of an organic light emitting display according to an embodiment of the present invention.

FIG. 11 shows a driving method of an organic light emitting display according to an embodiment of the present invention.

Figure 12:
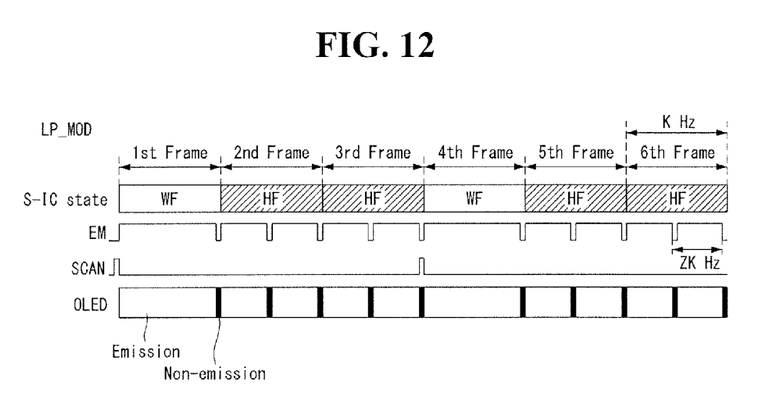
FIG. 12 illustrates a source driver's operation state and gate driving signals in low-power operation mode according to another embodiment of the present invention.

Referring to FIG. 11, in the present invention, low-power operation mode is detected, and at least one holding frame is placed between writing frames in which image data is written, in order to implement low-power operation mode (S1 and S2). Also, FIG. 12 illustrates a source driver's operation state and gate driving signals in low-power operation mode according to an embodiment.

In the present invention, in order to reduce power consumption, the output of the source driver is enabled during the writing frames, and the output of the source driver is disabled during the holding frames (S3).

In the present invention, in order to reduce flicker in low-power operation mode, the emission driver is controlled to increase the toggle frequency of the emission signal to be higher than or equal to N times the frame frequency (N is a positive integer greater than or equal to 2) during the writing frames (S4).

The driving method of an organic light emitting display according to the present invention is implemented substantially the same way as described with reference to FIGS. 1 to 10, so a detailed description of it will be omitted.

Throughout the description, it should be understood by those skilled in the art that various changes and modifications are possible without departing from the technical principles of the present invention. Therefore, the technical scope of the present invention is not limited to the detailed descriptions in this specification but should be defined by the scope of the appended claims.

What is claimed is:

1. An organic light emitting display comprising:
   a display panel;
   a source driver that drives data lines associated with the display panel;
   a scan driver that feeds a scan signal to scan lines associated with the display panel; an emission driver that feeds an emission signal with a toggle frequency to emission lines associated with the display panel; and
   a timing controller that, in low-power operation mode, places at least one holding frame between writing frames in which image data is written, enables the output of the source driver during the writing frames and disables the output of the source driver during the holding frames, and controls the emission driver during the holding frames to increase the toggle frequency of the emission signal to be higher than or equal to N times a frame frequency at which image data to be displayed on the display panel is input, where N is a positive integer greater than or equal to 2,
   wherein the timing controller controls the toggle frequency of the emission signal to be inversely proportional to an ON duty ratio of the emission signal.

2. The organic light emitting display of claim 1, wherein the timing controller controls the emission driver to increase the toggle frequency of the emission signal to be higher than or equal to N times the frame frequency during the writing frames.

3. The organic light emitting display of claim 1, wherein the timing controller controls the emission driver to keep the toggle frequency of the emission signal equal to the frame frequency during the writing frames.

4. The organic light emitting display of claim 1, further comprising:
   an interface block that receives image data from the outside;
   a memory block that stores information used for driving the display panel; and
   a gamma block that generates a gamma reference voltage and feeds the gamma reference voltage to the source driver,
   wherein the timing controller disables the operation of the interface block, memory block, and gamma block during the holding frames.

5. The organic light emitting display of claim 1, wherein the timing controller controls the scan driver to decrease the toggle frequency of the scan signal to be lower than the frame frequency.

6. The organic light emitting display of claim 1, wherein the display panel is a flexible display panel.

7. A driving method of an organic light emitting display including a display panel, a source driver that drives data lines associated with the display panel, a scan driver that feeds a scan signal to scan lines associated with the display panel, and an emission driver that feeds an emission signal with a toggle frequency to emission lines associated with the display panel, the method comprising:
   detecting a low-power operation mode of the organic light emitting display;
   placing at least one holding frame between writing frames in which image data is written, and enabling the output of the source driver during the writing frames and disabling the output of the source driver during the holding frames; and
   controlling the emission driver to increase the toggle frequency of the emission signal to be higher than or equal to N times a frame frequency at which image data to be displayed on the display panel is input, where N is a positive integer greater than or equal to 2 during the holding frames,
   wherein, in the increasing of the toggle frequency of the emission signal to be higher than or equal to N times the frame frequency, the toggle frequency of the emission signal is controlled to be inversely proportional to an ON duty ratio of the emission signal.

8. The method of claim 7, further comprising controlling the emission driver to increase the toggle frequency of the emission signal to be higher than or equal to N times the frame frequency during the writing frames.

9. The method of claim 7, further comprising controlling the emission driver to keep the toggle frequency of the emission signal equal to the frame frequency during the writing frames.

10. The method of claim 7, further comprising disabling the operation of an interface block, a memory block, and a gamma block during the holding frames,
   wherein the interface block receives image data from the outside, the memory block stores information required for driving the display panel, and the gamma block generates a gamma reference voltage and feeds the same to the source driver.

11. The method of claim 7, further comprising decreasing the toggle frequency of the scan signal to be lower than the frame frequency.

* * * * *